United States Patent [19]

Ide et al.

[11] 4,384,016

[45] May 17, 1983

[54] MUTIAXIALLY ORIENTED HIGH PERFORMANCE LAMINATES COMPRISED OF UNIAXIALLY ORIENTED SHEETS OF THERMOTROPIC LIQUID CRYSTAL POLYMERS

[75] Inventors: Yoshiaki Ide, North Plainfield; Alan Buckley, Berkeley Heights, both of N.J.

[73] Assignee: Celanese Corporation, New York, N.Y.

[21] Appl. No.: 290,554

[22] Filed: Aug. 6, 1981

[51] Int. Cl.³ .................. B29D 7/24; C08G 63/60; C08J 5/18
[52] U.S. Cl. .................................... 428/1; 156/308.2; 156/309.9; 428/105; 428/910
[58] Field of Search ................. 428/1, 910, 105; 156/308.2, 309.9, 272

[56] References Cited

FOREIGN PATENT DOCUMENTS 24499 3/1981 European Pat. Off. .

OTHER PUBLICATIONS

Krigbaum et al., "Aromatic Polyamides Forming Cholesteric Phases", *Journal of Polymer Science: Polymer Letters Edition*, vol. 17, pp. 601–607 (1979).

*Primary Examiner*—Marion McCamish
*Attorney, Agent, or Firm*—Burns, Doane, Swecker & Mathis

[57] ABSTRACT

Multiaxially oriented laminates comprised of substantially uniaxially oriented sheets of liquid crystal polymers and a method of production thereof are provided which exhibit desirable mechanical properties and good thermal and chemical resistance. The sheets which comprise the laminate are thermally bonded together and oriented at an angle to one another to provide the multiaxially oriented laminate. The mechanical properties of the laminate can be adapted for specific applications by adjustment of the number, thickness and angle of orientation of each sheet.

38 Claims, 2 Drawing Figures

MULTIAXIALLY ORIENTED HIGH PERFORMANCE LAMINATES COMPRISED OF UNIAXIALLY ORIENTED SHEETS OF THERMOTROPIC LIQUID CRYSTAL POLYMERS

BACKGROUND OF THE INVENTION

The present invention relates to multiaxially oriented high performance laminates fabricated from substantially uniaxially oriented sheets of thermotropic liquid crystal polymers.

It has in the past been very difficult to provide multiaxially oriented sheets of thermotropic polymers. When polymers which exhibit anisotropic properties in the melt phase (i.e., thermotropic liquid crystal polymers) are extruded through a slit die and drawn in the melt phase, films or sheets which exhibit high machine direction properties are obtained. However, such films or sheets also possess poor transverse directional properties which may limit the usefulness of such films or sheets in certain structural applications. It is therefore desirable to provide a sheet or film comprised of a thermotropic liquid crystal polymer which exhibits desirable multidirectional properties.

It has been suggested that films which exhibit a high degree of biaxial orientation could be prepared from nematogenic polymers by the lamination of uniaxially oriented films. See Krigbaum, W. R., et al., "Aromatic Polyamides Forming Cholesteric Phases", *Journal of Polymer Science:Polymer Letters Edition*, Vol. 17, pages 601–607, 1979.

It is also known to those skilled in the art that the heat treatment of shaped articles of liquid crystal polymers increases the melting temperature, molecular weight and mechanical properties of the polymer. See, for example, U.S. Pat. Nos. 3,975,487; 4,183,895; and 4,247,514.

OBJECTS AND SUMMARY OF THE INVENTION

It is therefore an object of the present invention to provide a multiaxially oriented laminate which exhibits desirable mechanical properties.

It is also an object of the present invention to provide a multiaxially oriented laminate comprised of several sheets of a thermoplastic material which can be fusion bonded together without substantial loss of desirable strength characteristics.

In one aspect of the present invention there is thus provided a method for the preparation of a laminate which exhibits multiaxial orientation, possesses desirable mechanical properties and excellent thermal and chemical resistance comprising:
  providing at least two sheets comprised of a substantially unidirectionally oriented thermotropic liquid crystal polymer; and
  subjecting said at least two sheets to thermal bonding conditions, the longitudinal axis of said sheets being oriented at an angle to each other so as to provide a laminate possessing multiaxial orientation comprised of said at least two sheets while retaining substantial uniaxial orientation within each sheet.

In another aspect of the present invention there are provided multiaxially oriented laminates comprised of sheets of substantially unidirectionally oriented thermotropic liquid crystal polymers thermally bonded together and oriented with respect to one another.

DETAILED DESCRIPTION OF THE INVENTION

Figure 1:
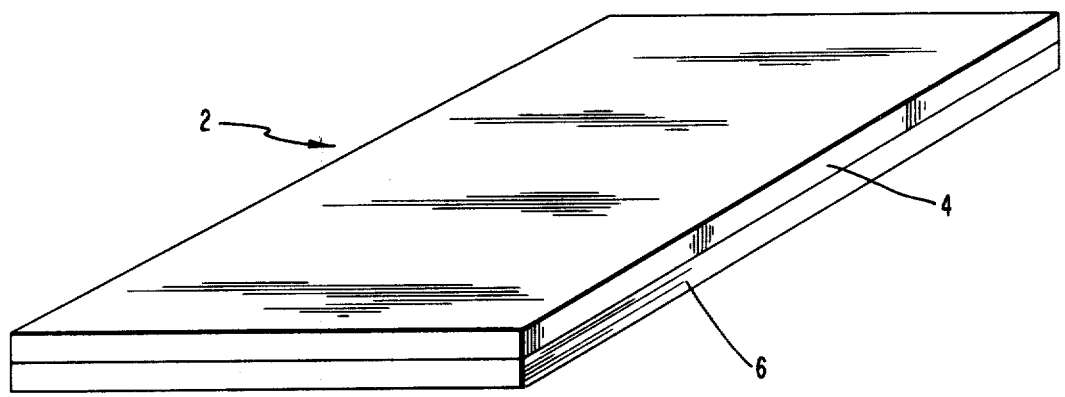
FIG. 1 depicts a biaxially oriented laminate of the present invention.

It has been found that thermotropic liquid crystal polymers are uniquely suted for use in multiaxially or multidirectionally oriented laminates due to the high degree of orientation of the polymers. Sheets comprised of such polymers can be fusion bonded together to provide a laminate of multiaxial orientation without substantial loss of the high degree of orientation of the polymers since the polymers substantially retain their high degree of orientation even in the melt phase.

Thermotropic liquid crystal polymers are polymers which are liquid crystalline (i.e., anisotropic) in the melt phase. These polymers have been described by various terms, including "liquid crystalline", "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystal polymers include but are not limited to wholly aromatic polyesters, aromatic-aliphatic polyesters, aromatic polyazomethines, aromatic polyester-carbonates and wholly or non-wholly aromatic polyester-amides. The wholly aromatic polymers are considered to be "wholly" aromatic in the sense that each moiety present in the polymer contributes at least one aromatic ring to the polymer backbone and which enables the polymer to exhibit anisotropic properties in the melt phase.

Such moieties include but are not limited to aromatic diols, aromatic amines, aromatic diacids and aromatic hydroxy acids. Moieties which may be present in the thermotropic liquid crystal polymers (wholly or non-wholly aromatic) employed in the polymers suitable for use in the present invention include but are not limited to the following:

-continued

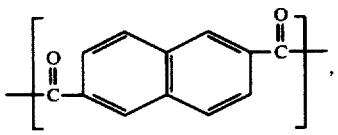,

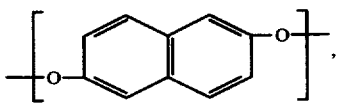,

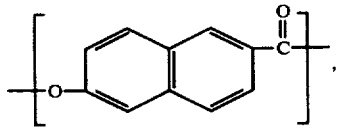,

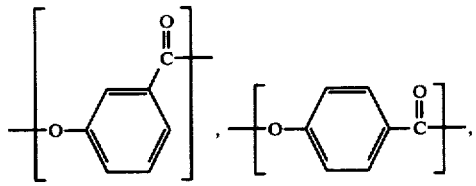,

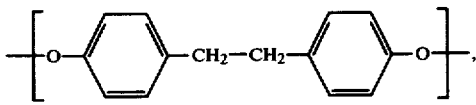,

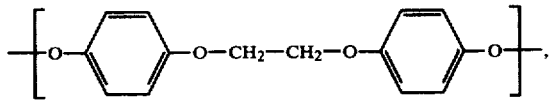,

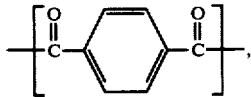,

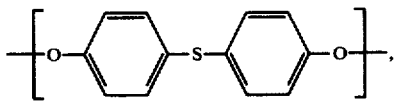,

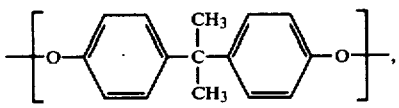,

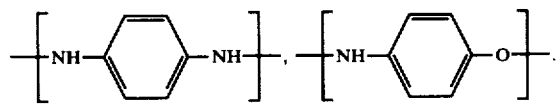.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine.

Specific examples of suitable aromatic-aliphatic polyesters are copolymers of polyethylene terephthalate and hydroxybenzoic acid as disclosed in *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymers can be found in "Liquid Crystal Polymers: I. Preparation and Properties of p-Hydroxybenzoic Acid Copolymers," *Journal of Polymer Science, Polymer Chemistry Edition*, Vol. 14, pp. 2043–58 (1976), by W. J. Jackson, Jr. and H. F. Kuhfuss. The above-cited references are herein incorporated by reference in their entirety.

Aromatic polyazomethines and processes of preparing the same are disclosed in the U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrilomethylidyne-1,4-phenylenemethylidyne); and poly(nitrilo-2-chloro-1,4-phenylenenitrilomethylidyne-1,4-phenylenemethylidyne).

Aromatic polyester-carbonates are disclosed in U.S. Pat. No. 4,107,143, which is herein incorporated by reference in its entirety. Examples of such polymers include those consisting essentially of p-oxybenzoyl units, p-dioxyphenyl units, dioxycarbonyl units, and terephthoyl units.

Aromatic polyester-amides and processes of preparing the same are disclosed in the U.S. Pat. No. 4,182,842 and in commonly-assigned U.S. Patent application Ser. No. 214,557, filed Dec. 9, 1980 (now U.S. Pat. No. 4,330,457). Further disclosure of such copolymers can be found in "Liquid Crystal Polymers: III Preparation and Properties of Poly(Ester Amides) from p-Aminobenzoic Acid and Poly(Ethylene Terephthalate)", *Journal of Applied Polymer Science*, Vol. 25 pp. 1685–1694 (1980), by W. J. Jackson, Jr. and H. F. Kuhfuss. The above cited disclosures are herein incorporated by reference in their entirety.

The liquid crystal polymers which are preferred for use in the present invention are the thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,201,856; 4,238,600; 4,247,514; 4,226,970; 4,232,143; 4,232,144 and 4,245,082; and (f) U.K. Application No. 2,002,404.

Wholly aromatic polymers which are preferred for use in the present invention include wholly aromatic polyesters and poly(ester-amide)s which are disclosed in commonly-assigned U.S. Pat. Nos. 4,067,852; 4,083,829; 4,130,545; 4,161,470; 4,184,996; 4,238,599; 4,238,598; 4,230,817; 4,224,433; 4,256,624 and 4,219,461; and in commonly-assigned U.S. Application Ser. Nos. 91,003, filed Nov. 5, 1979 (now U.S. Pat. No. 4,337,191); 128,778, filed Mar. 10, 1980; 128,759, filed Mar. 10, 1980 (now U.S. Pat. No. 4,299,756); and 214,557, filed Dec. 9, 1980 (now U.S. Pat. No. 4,330,457). The disclosures of all of the above-identified commonly-assigned U.S. patents and applications are herein incorporated by reference in their entirety. The wholly aromatic polymers disclosed therein typically are capable of forming an anisotropic melt phase at a temperature below approximately 400° C., and preferably below approximately 350° C.

The polymers such as wholly aromatic polyesters and poly(ester-amide)s which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., BF₃), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble in pentafluorophenol to a limited degree.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic poly(ester-amide)s which are preferred commonly exhibit a molecular weight of about 5,000 to 50,000 and preferably about 10,000 to 30,000; e.g., 15,000 to 17,000. Such molecular weight may be determined by gel permeation chromatography as well as by other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and poly(ester-amide)s additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

Especially preferred wholly aromatic polyesters are those which are disclosed in above-noted U.S. Pat. Nos. 4,161,470; 4,184,996; 4,219,461; 4,256,624; and 4,238,599. Preferably, the wholly aromatic polyester comprises not less than about 10 mole percent of recurring units which include a naphthalene moiety such as 6-oxy-2-naphthoyl, 2,6-dioxynaphthalene, and 2,6-dicarboxynaphthalene. Preferred poly(ester-amide)s are disclosed in U.S. Application Ser. No. 214,557 (now U.S. Pat. No. 4,330,457).

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

I is 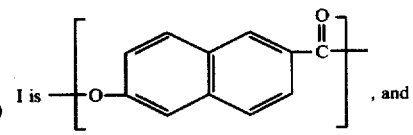 , and

II is 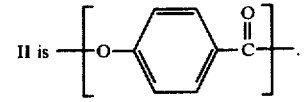 .

The polyester comprises approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl and substituted phenyl, and mixtures thereof.

The wholly aromatic polyester which is disclosed in U.S. Pat. No. 4,184,996 is a melt processable wholly aromatic polyester capable of forming an anisotropic melt phase at a temperature below approximately 325° C. The polyester consists essentially of the recurring moieties I, II, and III wherein:

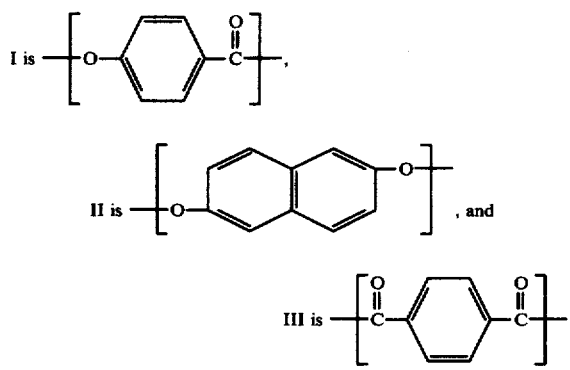

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl and substituted phenyl, and mixtures thereof.

The wholly aromatic polyester which is disclosed in U.S. Pat. No. 4,238,599 is a melt processable polyester capable of forming an anisotropic melt phase at a temperature no higher than approximately 320° C. consisting essentially of the recurring moieties I, II, III and IV wherein:

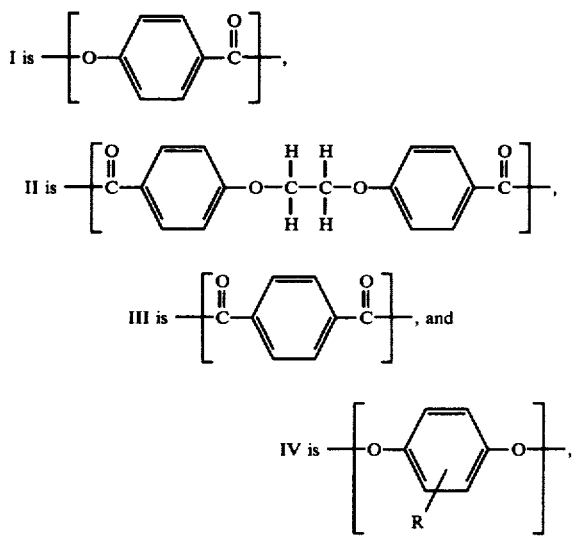

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl and substituted phenyl, and mixtures thereof. This wholly aromatic polyester commonly exhibits an inherent viscosity of at least 2.0 dl./g., e.g., 2.0 to 10.0 dl./g., when dissolved in a concentration of 0.3 weight-/volume percent in pentafluorophenol at 60° C.

The polyester disclosed in U.S. Pat. No. 4,219,461 is a melt processable wholly aromatic polyester which is capable of forming an anisotropic melt phase at a temperature below approximately 320° C. The polyester consists essentially of the recurring ring moieties I, II, III, and IV wherein:

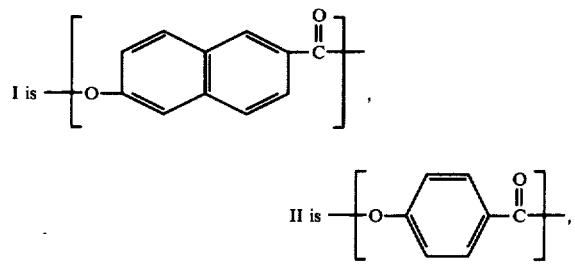

III is a dioxy aryl moiety of the formula $\{O-Ar-O\}$ wherein Ar is a divalent radical comprising at least one aromatic ring, and IV is a dicarboxyl aryl moiety of the formula

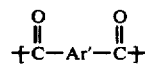

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III, and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a napthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

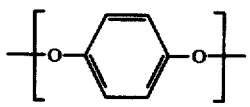

and the preferred dicarboxy aryl moiety IV is:

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II and III wherein:

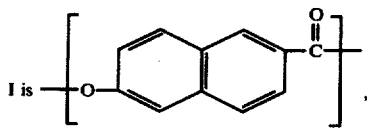

II is a dioxy aryl moiety of the formula ⁺O—Ar—O⁺ where Ar is a divalent radical comprising at least one aromatic ring, and III is a dicarboxy aryl moiety of the formula

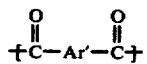

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

As with moieties, III and IV of the polyester disclosed in U.S. Pat. No. 4,219,461, moieties II and III of the polyester described immediately above may be symmetrical or nonsymmetrical, but are preferably symmetrical.

Preferred moieties II and III are set forth in above-noted U.S. Pat. No. 4,256,624. The preferred dioxy aryl moiety II is:

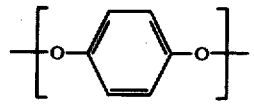

and the preferred dicarboxy aryl moiety III is:

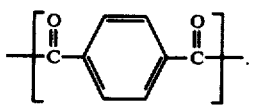

U.S. Application Ser. No. 214,557, filed Dec. 9, 1980 (now U.S. Pat. No. 4,330,457), discloses a melt processable poly(ester-amide) which is capable of forming an anisotropic melt phase at a temperature below approximately 400° C. The poly(ester-amide) consists essentially of the recurring moieties I, II, III and optionally IV wherein:

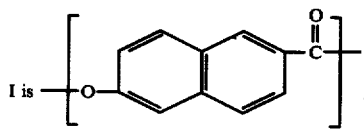

II is

where A is a divalent radical comprising at least one aromatic ring or a divalent transcyclohexane radical;

III is ⁺Y—Ar—Z⁺, where Ar is a divalent radical comprising at least one aromatic ring, Y is O, NH, or NR, and Z is NH or NR, where R is an alkyl group of 1 to 6 carbon atoms or an aryl group; and IV is ⁺—O—Ar'—O⁺, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 percent of moiety III, and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties II, III and IV are set forth in above-noted U.S. Application Ser. No. 214,557. The preferred dicarboxy aryl moiety II is:

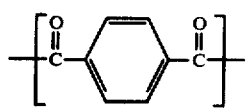

the preferred moiety III is:

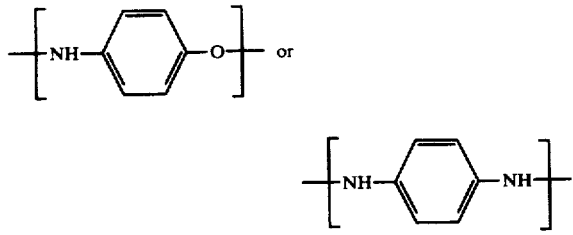

and the preferred dioxy aryl moiety IV is:

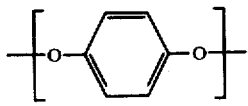

The laminates of the present invention will be discussed in detail with reference to FIGS. 1 and 2. The laminates 2 are comprised of at least two sheets 4, 6, 8, 10, 12 of a suitable thermotropic liquid crystal polymer. The sheets need not consist of the same polymer; i.e., each sheet of which the laminate is comprised may consist of a different thermotropic liquid crystal polymer. Such varied composition of the laminate may be advantageous depending upon whether it is desirable to optimize certain physical characteristics (e.g., solvent resistance, melting temperature) of various portions of the laminate. That is, one of the sheets 4 of the laminate may be comprised of a liquid crystal polymer which exhibits a higher melting temperature than the polymer which comprises an adjacent sheet 6. Such an arrangement may be of an advantage during fusion bonding of the sheets together as hereinafter explained.

The individual sheets of which the laminate is comprised may be produced in any conventional manner. Extrusion and melt drawing of the polymer under suitable temperature and pressure conditions through a slit die of appropriate size to form a sheet is a preferred method of production. It is to be understood that the term "sheet" as used herein includes any of the various relatively thin, substantially flat structures which may be known in the art as sheets, slabs, films, etc. The thickness of the respective sheets of which the laminate is comprised is not critical and will generally depend upon the intended use of the laminate (e.g., greater strength requirements may necessitate use of sheets of increased thickness). It should be noted that the sheets so produced will substantially exhibit a uniaxial or unidirectional orientation.

The existence of such uniaxial or unidirectional orientation can be determined by measurement of tensile properties (i.e., tensile strength) of the sheet in both the machine (MD) and transverse (TD) direction by standard test method ASTM D882. Suitable uniaxial orientation exists when the ratio of machine direction to transverse direction tensile strength of the sheet exceeds about 2.0 and preferably ranges from about 2.0 to 100. Most preferably, the ratio ranges from about 10 to 50.

The particular extrusion apparatus used is not critical and any suitable apparatus may be used herein. Examples of suitable extrusion apparatus are described in *Plastics Engineering Handbook of the Society of the Plastics Industry, Inc.*, Fourth Edition, edited by Joel Frados, Van Nostrand Reinhold Company (1976), pages 156-203.

The conditions of temperature and pressure under which the liquid crystal polymer can be extruded to form the sheets are not critical to the present invention and can easily be determined by one of ordinary skill in the art. Typically, thermotropic liquid crystal polymers can be extruded at a temperature within the range of approximately 250° C. to 350° C. (depending upon the melting temperature of the polymer) and at a pressure within the range of approximately 100 p.s.i. to 5,000 p.s.i.

In order to ensure that the sheets as extruded exhibit the desired uniaxially orientation, the extruded polymer melt is preferably subjected to a drawing step. The draw down (or area reduction) ratio will generally be in excess of about 5.0. The drawn polymer is then cooled or quenched by appropriate means such as by chill rolls, blowing air or water quench.

The extruded sheets of the thermotropic liquid crystal polymers typically exhibit a density of about 1.2 to about 1.4 grams/cm$^3$. When lightweight sheets are desired as a core member, foamed sheets of a density from about 0.3 to 0.7 grams/cm$^3$ can be extruded by incorporation of a blowing agent in a conventional manner. Such foamed sheets are generally not deemed to possess substantial uniaxial orientation as hereinbefore defined but may nonetheless be incorporated into the laminate to enhance the flexural strength of the laminate without significantly increasing the weight of the laminate.

Various conventional fillers and reinforcing agents may also be employed to enhance various characteristics of the polymer sheet. For example, suitable reinforcing agents such as glass fibers or carbon fibers may be employed to provide reinforcement for the sheet. In addition, other types of additives such as pigments, antioxidants, UV stabilizers, etc. may be added to provide a polymer of specific characteristics. The amount of such fillers ranges approximately from 0.2 to 10 percent by weight and preferably ranges from about 0.5 to about 2 percent by weight. The reinforcing agents may be employed in various amounts up to about 50 percent by weight, such as from 10 to 50 percent by weight.

At least two sheets of the thermotropic liquid crystal polymer are fusion bonded together to provide the laminates 2 of the present invention. The sheets are arranged such that the longitudinal axis of the respective sheets (i.e., the machine direction axis if formed by extrusion) are oriented in transverse (e.g., perpendicular) directions. The laminate thus exhibits multiaxial as opposed to uniaxial characteristics.

The angle of orientation of the longitudinal or machine direction axes of the sheets which comprise the laminate (denoted as the smallest angle as measured between said axes) will preferably range from about 90° to about 30° in order to take advantage of the various physical properties of the sheets. In order to obtain a laminate which exhibits maximum machine direction and transverse direction mechanical properties, it is preferable to orient the sheets such that the longitudinal axis of one sheet is substantially perpendicular to the longitudinal axis of an adjacent sheet in the laminate (i.e., the sheets are oriented at an angle of 90° relative to one another as shown in FIG. 1). Such a configuration results in a laminate possessing maximum biaxial properties.

The respective sheets need not merely be oriented along two different directions, but can be oriented along three or more directions if a more multiaxial configuration is desired as opposed to only a biaxial configuration. See, for example, FIG. 2 wherein sheet 8 is oriented at 45° to sheet 10 and at 90° to sheet 12. Sheet 10 is thus oriented at 45° to each of sheets 8 and 12.

In addition, the laminate may include multiple (e.g., two) sheets of a liquid crystal polymer oriented in one direction and additional (e.g., two) sheets of a liquid crystal polymer oriented in a transverse direction. Sheets of similar orientation need not be placed adjacent to one another but can be integrated throughout the laminate such that the sheets alternate with respect to their respective orientations.

The sheets contained within the laminate can be fusion bonded together by various methods. Preferably, the sheets are heat or fusion bonded together by providing the desired number of sheets which are sized and shaped appropriately and placed together such that opposing surfaces of the sheets contact the surfaces of adjacent sheets. The sheets are then heated and pressed together for a sufficient period of time until the sheets adhere to each other. The sheets may also be heated individually prior to being pressed together. Preferably, the sheets are heated to a temperature in excess of the melting temperature of the polymer. Lower temperatures can also be employed but increased pressures may then be required. Generally, the sheets need only be heated to a temperature between the melting temperature of the polymer and about 30 centigrade degrees and preferably less than 20 centigrade degrees in excess of the melting temperature. Heating the sheets to a greater extent may subject the sheets to undesirably high temperatures wherein the polymer in the sheets may flow excessively and loss in orientation may occur.

Preferably, the sheets are subjected to thermal bonding conditions such that the sheets comprising the laminate retain substantial uniaxial orientation. For purposes of the present invention, the sheets are deemed to retain substantial uniaxial orientation if the tensile strength of the sheet measured in the machine direction is decreased by less than about one-half and preferably less than about one-third, such as for example, less than ten percent. It is possible to determine the relationship between fusion temperatures and resulting tensile properties for the sheets to be employed prior to production of the laminate in the same manner as set forth in Example 2 below, albeit with the tensile properties being determined for each sheet instead of with the laminate. Fusion temperatures may then be employed during production of the laminate which minimizes the loss of tensile strength in the sheets.

One specific advantage of the use of thermotropic liquid crystal polymers in multiaxially oriented laminates relates to the adhesion of the sheets together by fusion bonding. The sheets may be heated to temperatures above the melting temperature of the polymer without significant loss of the high degree of orientation exhibited by the polymers therein. Such polymers retain their anisotropic characteristics even in the melt phase, enabling the use of adhesives, etc. to be avoided when bonding the sheets together. The individual sheets thus desirably retain substantial uniaxial orientation upon formation of the laminate in contrast to conventional thermoplastic polymers which substantially lose their orientation upon being subjected to fusion temperatures. Simple heat fusion techniques may be employed without loss of the desirable physical characteristics exhibited by the sheets and without use of extraneous materials (e.g., adhesives) to achieve the desired bonding. Such an advantage may be important in the event that the laminate is employed in an environment wherein an adhesive may be susceptible to degradation, etc. but wherein the sheets which comprise the laminate itself are not subject to degradation. Such environments include high temperature environments (e.g., temperatures in excess of about 200° C.) and applications where the adhesive may be subject to chemical attack by solvents, acids, etc.

In lieu of simply fusion bonding the sheets together by heating all of the sheets to a temperature in excess of their melting temperature, it is possible to employ an intermediate sheet 10 sandwiched between two outer sheets 8, 12 which has a lower melting point than the outer sheets 8, 12. As a result of the outer sheets 8, 12 having been heat treated to increase the melting temperature thereof (or the intermediate sheet 10 being comprised of a polymer which exhibits a lower melting temperature), it is therefore possible to heat the sheets to a temperature which is in excess of only the melting temperature of the intermediate sheet. The sheets can thus be fusion bonded together by heating all of the sheets to a temperature in excess of the melting temperature of the intermediate sheet 10 but which temperature is below the melting point of the outer sheets 8, 12. The intermediate sheet 10 can, of course, comprise a liquid crystal polymer or any other thermoplastic polymer. Preferably, however, each sheet is comprised of a liquid crystal polymer.

The mechanical properties of laminates produced in accordance with the present invention can be improved still further by subjecting the laminates to a heat treatment following formation thereof. In such an instance, the sheets which comprise the laminate would not be heat treated prior to production of the laminate. The heat treatment improves the properties of the laminate by increasing the molecular weight of the liquid crystalline polymer and increasing the degree of crystallinity thereof while also increasing the melting point of the polymer.

The laminates may be thermally treated in an inert atmosphere (e.g., nitrogen, carbon dioxide, argon, helium) or alternatively, in a flowing oxygen-containing atmosphere (e.g., air). It is preferable for such heat treatment to occur in an inert atmosphere to avoid any possible oxidative degradation of the polymer. For instance, the laminate may be brought to a temperature approximately 10 to 30 centigrade degrees below the melting temperature of the liquid crystal polymer, at which temperature the laminate remains a solid object. It is preferable for the temperature of the heat treatment to be as high as possible without equaling or exceeding the melting temperature of the polymer. It is most preferable to gradually increase the temperature of heat treatment in accordance with the increase of the melting temperature of the polymer during heat treatment.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment can be shortened for higher melting polymers, since higher heat treatment temperatures can be applied without melting the polymer.

Increase in both tensile strength and flexural strength can be achieved as a result of the heat treatment. However, the most notable increase which is observed occurs with respect to impact resistance. In addition, the melting temperature of the liquid crystal polymer can be increased from between about 10 to about 50 centigrade degrees as a result of the heat treatment, and preferably from about 20 to about 50 centigrade degrees, with the amount of increase which is obtained being dependent upon the temperature used in the heat treatment, with higher heat treatment temperatures giving greater increases.

The chemical resistance also increases with heat treatment and the solubility into pentafluorophenol, one of the rare solvents for thermotropic liquid crystal polymers, continuously decreases with increasing heat treatment time and eventually the material does not dissolve even minimally (such as in amounts of 0.1 percent by weight). Accordingly, reference herein to the degree of solvation of preferred thermotropic liquid crystal polymers is intended to refer to said characteristics prior to heat treatment of the polymer.

The invention is additionally illustrated in connection with the following Examples which are to be considered as illustrative of the present invention. It should understood, however, that the invention is not limited to the specific details of the Examples.

EXAMPLE 1

Pellets of a thermotropic liquid crystal polymer comprised of 75 mole percent of a p-oxybenzoyl moiety and 25 mole percent of a 6-oxy-2-naphthoyl moiety are dried at a temperature of 130° C. for 12 hours in a vacuum. The polymer is extruded by use of a ¾ inch Brabender extruder with a slit die of dimensions 10.15 cm × 1.65 mm at a speed of 2.58 meters/minute. The width and thickness of the extruded sheet are 8.15 cm × 0.15 mm and the melt draw down ratio of the sheet is 13.7. The extruded sheet is heat treated with an increase of the treatment temperature to 260° C. over 1 hour followed by an increase to 310° C. over 11 hours after which treatment the melting temperature of the polymer is increased from 300° C. to 336° C.

The tensile properties of the sheet are determined both before and after heat treatment by testing procedure ASTM D882. The tensile properties are determined along various axes of the sheet (i.e., along the machine direction, machine direction +30°, machine direction +60°, and along the transverse direction) by cutting sections from the sheet along the desired axis and testing the tensile properties of the cut portions. The angular dependence of the tensile properties is summarized below in Table I:

TABLE I

| | Angular Dependence Of Tensile Properties Of Non-Laminated Sheets | | | |
|---|---|---|---|---|
| Non-Laminated Sample | Axis | Tensile Strength ($10^3$ psi) | Elongation (%) | Initial Modulus ($10^6$ psi) |
| 1 (as extruded) | MD | 69.6 | 4.42 | 2.22 |
| 1 (heat extruded) | MD | 96.3 | 7.36 | 1.97 |
| 2 (as extruded) | MD + 30° | 21.5 | 12.1 | 0.532 |
| 2 (heat treated) | MD + 30° | 17.9 | 19.8 | 0.432 |
| 3 (as extruded) | MD + 60° | 10.4 | 29.1 | 0.290 |
| 3 (heat treated) | MD + 60° | 8.03 | 45.3 | 0.220 |
| 4 (as extruded) | TD | 7.99 | 33.0 | 0.238 |

TABLE I-continued

| | Angular Dependence Of Tensile Properties Of Non-Laminated Sheets | | | |
|---|---|---|---|---|
| Non-Laminated Sample | Axis | Tensile Strength ($10^3$ psi) | Elongation (%) | Initial Modulus ($10^6$ psi) |
| 4 (heat treated) | TD | 6.94 | 88.6 | 0.212 |

The tensile strength data in Table I demonstrates that extruded sheets of a thermotropic liquid crystal polymer possess highly anisotropic properties. As the angle of the axis along which the tensile strength is determined increases with respect to the machine direction axis, the tensile strength of the laminate measured along that axis decreases. The significant difference between the tensile strength (MD) and the tensile strength (TD) graphically illustrates the fact that such sheets are highly anisotropic in nature.

EXAMPLE 2

Figure 2:
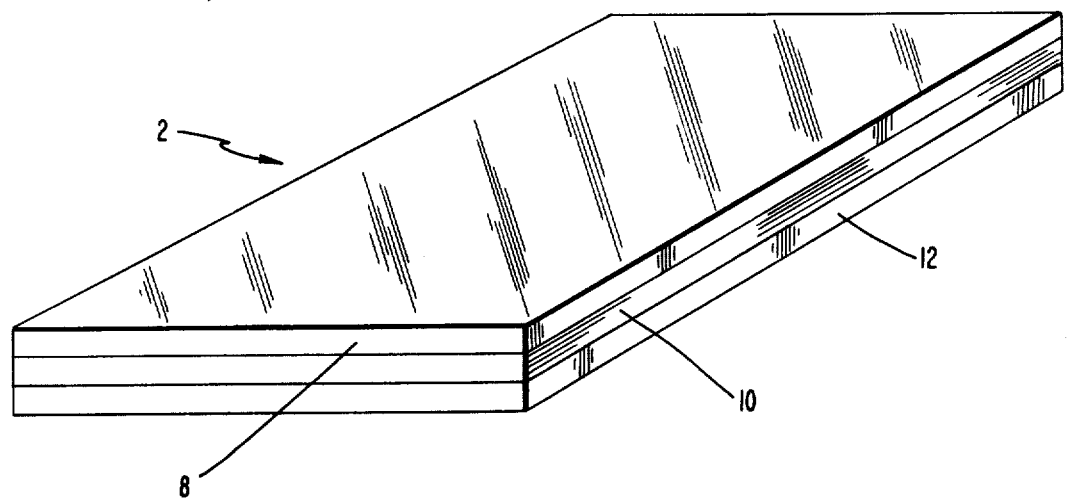
FIG. 2 depicts a triaxially oriented laminate of the present invention.

Two sheets which are formed according to the extrusion procedure described in Example 1 are cross-laminated in such a manner that the machine direction axis of one sheet is perpendicular to the machine direction axis of the other sheet as shown in FIG. 1. The sheets are pressed together for one minute in a hot press so as to heat the sheets to the 300° C. melting temperature of the sheets. Within 15 to 20 seconds of being placed in the press, the temperature of the sheets is within 5° C. of the final temperature. This procedure is repeated for three additional laminates at temperatures in excess of 300° C., with the tensile properties of each of the laminates (in the main axis direction) being measured according to ASTM D882. The tensile properties of each of the laminates are set forth in Table II below:

TABLE II

| | Lamination Temperature Dependence of Tensile Properties Of Cross-Laminated Sheets | | | |
|---|---|---|---|---|
| Laminated Sample | Lamination Temperature (°C.) | Tensile Strength ($10^3$ psi) | Elongation (%) | Initial Modulus ($10^6$ psi) |
| 1 | 300 | 29.2 | 6.13 | 0.831 |
| 2 | 310 | 23.3 | 6.82 | 0.654 |
| 3 | 320 | 19.4 | 16.7 | 0.421 |
| 4 | 330 | 9.24 | 8.77 | 0.331 |

Example 2 illustrates the advantages of employing sheets comprised of thermotropic liquid crystal polymers in the laminates of the present invention. The biaxially-oriented laminates of Example 2 retain their orientation even upon being heated to temperatures in excess of the melting temperature of the polymer of which the laminates are comprised. Conventional thermoplastic polymeric materials which are not capable of forming an anisotropic melt phase by contrast exhibit rapid and substantial relaxation of polymer orientation upon being similarly heated.

EXAMPLE 3

Cross-laminated laminates are produced in the same manner as described in Example 2 with some of the laminates being heat treated. The heat treatment procedure involves an increase of the treatment temperature to 260° C. over 1 hour followed by an increase to 310° C. over 11 hours. The laminates are formed by heat pressing at 330° C. Tensile properties of the laminates are determined as previously described and set forth below:

TABLE III

Effect of Heat Treatment Upon Laminate Tensile Properties

| Laminated Sample | Axis | Tensile Strength ($10^3$ psi) | Elongation (%) | Initial Modulus ($10^6$ psi) |
|---|---|---|---|---|
| 5 (non-heat treated) | MD or TD | 10.7 | 18.4 | 0.318 |
| 6 (heat treated) | MD or TD | 22.6 | 33.1 | 0.319 |
| 7 (non-heat treated) | MD + 45° | 13.7 | 40.3 | 0.351 |
| 8 (heat treated) | MD + 45° | 15.9 | 41.5 | 0.317 |

Example 3 demonstrates that the tensile properties of the laminates of the present invention advantageously exhibit reduced anisotropy. That is, the difference between the tensile properties (MD) and tensile properties (TD) is reduced in comparison to non-laminated sheets. Heat treatment of the laminate subsequent to being formed enhances the tensile properties of the laminate.

EXAMPLE 4

A laminate is produced by placing a non-heat treated sheet between two heat treated sheets and heat pressing the sheets together at 340° C. for one minute. The outer sheets are oriented at angle of 90° to each other and the inner sheet is oriented at an angle of 45° to the outer sheets as depicted in FIG. 2. The outer sheets are heat treated as in Example 1. The tensile properties of the laminate are determined along various axes as set forth in Table IV:

TABLE IV

Angular Dependence of Tensile Properties of Laminate Comprised of Three Non-Parallel Sheets

| Axis | Tensile Strength ($10^3$ psi) | Elongation (%) | Initial Modulus ($10^6$ psi) |
|---|---|---|---|
| MD | 20.2 | 4.96 | 0.722 |
| MD + 45° | 13.9 | 13.2 | 0.379 |
| TD | 22.0 | 6.14 | 0.632 |

Example 4 demonstrates that multi-axially oriented laminates can be provided according to the present invention which desirably exhibit reduced anisotropic tensile properties.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. A method of providing a laminate which exhibits multiaxial orientation, possesses desirable mechanical properties and excellent thermal and chemical resistance comprising:
   (a) providing at least two sheets comprised of a substantially unidirectionally oriented polymer which is capable of forming an anisotropic melt phase; and
   (b) subjecting said at least two sheets to thermal bonding conditions, the longitudinal axis of said sheets being oriented at an angle to each other so as to provide a laminate possessing multiaxial orientation comprised of said at least two sheets while retaining substantial uniaxial orientation within said sheets.

2. The method of claim 1 wherein said thermal bonding conditions include heating at least one of said sheets to a temperature in excess of the melting temperature of the polymer which comprises said at least one sheet and pressing said sheets together.

3. The method of claim 2 wherein said at least one sheet is heated to a temperature between the melting temperature of the polymer which comprises said sheet and about 20 centigrade degrees in excess of said melting temperature.

4. The method of claim 1 wherein said at least two sheets are oriented at an angle of between about 30° and 90° relative to one another.

5. The method of claim 1 wherein said at least two sheets are oriented at an angle of about 90° relative to one another.

6. The method of claim 1 wherein said laminate is heat treated at a temperature below the melting temperature of the polymer comprising said at least two sheets and for a period of time sufficient to increase the melting temperature of said polymer.

7. The method of claim 6 wherein said melting temperature is increased from between about 20 to about 50 centigrade degrees.

8. The method of claim 6 wherein said heat treatment temperature ranges from about 10 to about 30 centigrade degrees below the melting temperature of the polymer and said heat treatment occurs in a non-oxidizing atmosphere.

9. The method of claim 1 wherein said polymer comprises a wholly aromatic polymer.

10. The method of claim 9 wherein said polymer comprises a wholly aromatic polyester.

11. The method of claim 10 wherein said polymer comprises a wholly aromatic polyester which comprises not less than about 10 mole percent of recurring units which include a naphthalene moiety.

12. The method of claim 11 wherein said wholly aromatic polyester exhibits an inherent viscosity of at least 2.0 dl./g. when dissolved in a concentration of 0.1 percent by weight in pentafluorophenol at 60° C.

13. The method of claim 11 wherein said naphthalene moiety of said wholly aromatic polyester is selected from the group consisting of a 6-oxy-2-naphthoyl moiety, a 2,6-dioxynaphthalene moiety, and a 2,6-dicarboxynaphthalene moiety.

14. The method of claim 10 wherein said wholly aromatic polyester comprises a melt processable wholly aromatic polyester which is capable of forming an anisotropic melt phase and consists essentially of the recurring moieties I, II, and III wherein:

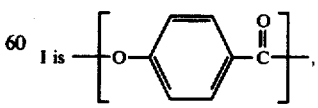

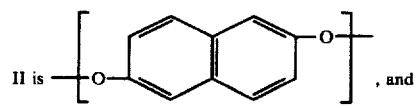
, and

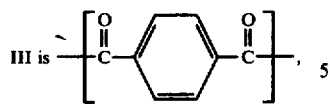

and wherein said polyester comprises approximately 30 to 70 mole percent of moiety I and wherein at least some of the hydrogen atoms present upon the rings optionally may be replaced by substitution selected from the group consisting of an alkyl group of 1 to 5 carbon atoms, an alkoxy group of 1 to 5 carbon atoms, halogen, phenyl and substituted phenyl, and mixtures thereof.

15. The method of claim 10 wherein said wholly aromatic polyester comprises a melt processable wholly aromatic polyester which is capable of forming an anisotropic melt phase and consists essentially of the recurring moieties I and II wherein:

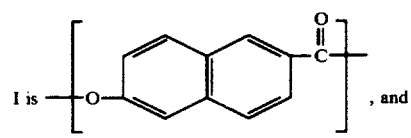

and wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 5 carbon atoms, and alkoxy group of 1 to 5 carbon atoms, halogen, phenyl and substituted phenyl, and mixtures thereof.

16. The method of claim 10 wherein said wholly aromatic polyester comprises a melt processable wholly aromatic polyester which is capable of forming an anisotropic melt phase and consists essentially of the recurring moieties I, II, III, an IV wherein

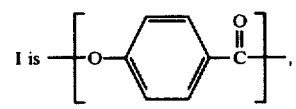

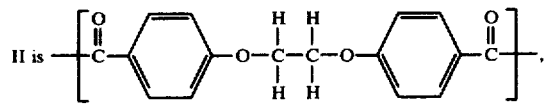

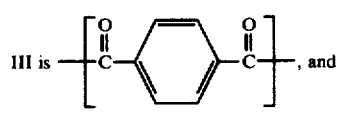

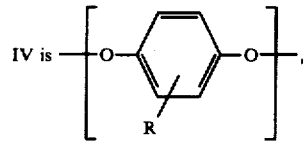

where
R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV and wherein at least some of the hydrogen atoms present upon the rings optionally may be replaced by substitution selected from the group consisting of an alkyl group of 1 to 5 carbon atoms, an alkoxy group of 1 to 5 carbon atoms, halogen, phenyl and substituted phenyl, and mixtures thereof.

17. The method of claim 10 wherein said wholly aromatic polyester comprises a melt processable wholly aromatic polyester which is capable of forming an anisotropic melt phase and consists essentially of the recurring moieties I, II, III, and IV wherein:

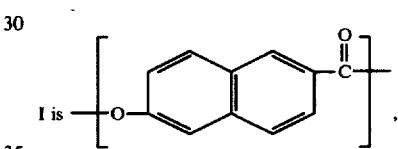

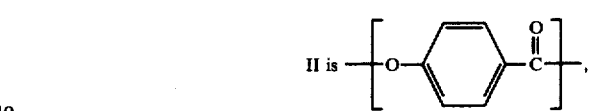

III is a dioxy aryl moiety of the formula $\{-O-Ar-O-\}$ wherein Ar is a divalent radical comprising at least one aromatic ring, and IV is a dicarboxy aryl moiety of the formula

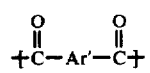

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

18. The method of claim 10 wherein said wholly aromatic polyester comprises a melt processable wholly aromatic polyester which is capable of forming an anisotropic melt phase and consists essentially of the recurring moieties I, II and III wherein:

I is 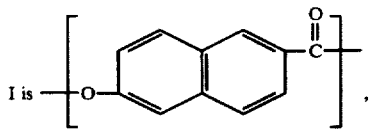,

II is a dioxy aryl moiety of the formula {—O—Ar—O—} where Ar is a divalent radical comprising at least one aromatic ring, and III is a dicarboxy aryl moiety of the formula $$+C(=O)-Ar'-C(=O)+$$

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

19. The method of claim 9 wherein said wholly aromatic polymer comprises a melt processable poly(ester-amide) which is capable of forming an anisotropic melt phase and which consists essentially of the recurring moieties I, II, and III and optionally IV wherein:

I is 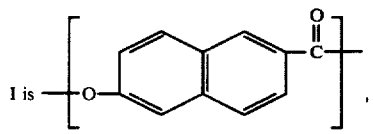,

II is

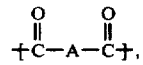, where A is a divalent radical comprising at least one aromatic ring of a divalent transcyclohexane radical;

III is {Y—Ar—Z}, where Ar is a divalent radical comprising at least one aromatic ring, Y is O, NH, or NR, and Z is NH or NR, where R is an alkyl group of 1 to 6 carbon atoms or an aryl group; and IV is {O—Ar'—O}, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

20. A laminate which exhibits multiaxial orientation, possesses desirable mechanical properties and desirable thermal and chemical resistance comprised of at least two sheets of a substantially unidirectionally oriented polymer which is capable of forming an anisotropic melt phase, said at least two sheets being thermally bonded together and oriented at an angle with respect to one another.

21. The laminate of claim 20 wherein said sheets are thermally bonded together by heating at least one of said sheets to a temperature in excess of the melting temperature of the polymer which comprises said at least one sheet and pressing said sheets together.

22. The laminate of claim 21 wherein said at least one sheet is heated to a temperature between the melting temperature of the polymer which comprises said sheet and about 20 centigrade degrees in excess of said melting temperature.

23. The laminate of claim 20 wherein said at least two sheets are oriented at an angle of between about 30° and 90° relative to one another.

24. The laminate of claim 20 wherein said at least two sheets are oriented at an angle of about 90° relative to one another.

25. The laminate of claim 20 wherein said laminate has been subjected to a heat treatment at a temperature below the melting temperature of the polymer comprising said at least two sheets and for a period of time sufficient to increase the melting temperature of said polymer.

26. The laminate of claim 25 wherein said melting temperature is increased from between about 20 to about 50 centigrade degrees.

27. The laminate of claim 25 wherein said heat treatment temperature ranges from about 10 to about 30 centigrade degrees below the melting temperature of the polymer and said heat treatment occurs in a non-oxidizing atmosphere.

28. The laminate of claim 20 wherein said polymer comprises a wholly aromatic polymer.

29. The laminate of claim 28 wherein said polymer comprises a wholly aromatic polyester.

30. The laminate of claim 29 wherein said wholly aromatic polyester comprises a melt processable wholly aromatic polyester which is capable of forming an anisotropic melt phase and consists essentially of the recurring moieties I, II, and III wherein:

I is 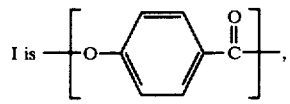,

II is 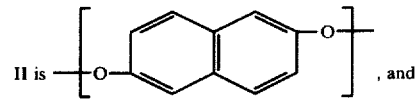, and

III is 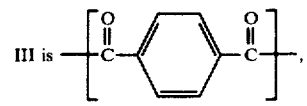, and wherein said polyester comprises approximately 30 to 70 mole percent of moiety I and wherein at least some of the hydrogen atoms present upon the rings optionally may be replaced by substitution selected from the group consisting of an alkyl group of 1 to 5 carbon atoms, an alkoxy group of 1 to 5 carbon atoms, halogen, phenyl and substituted phenyl, and mixtures thereof.

31. The laminate of claim 29 wherein said wholly aromatic polyester comprises a melt processable wholly aromatic polyester which is capable of forming an anisotropic melt phase and consists essentially of the recurring moieties I and II wherein:

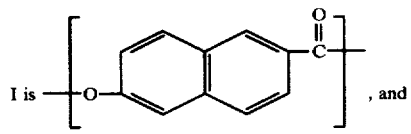, and

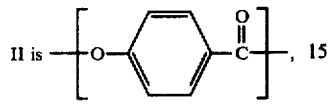

and wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 5 carbon atoms, an alkoxy group of 1 to 5 carbon atoms, halogen, phenyl and substituted phenyl, and mixtures thereof.

32. The laminate of claim 29 wherein said wholly aromatic polyester comprises a melt processable wholly aromatic polyester which is capable of forming an anisotropic melt phase and consists essentially of the recurring moieties I, II, III, and IV wherein:

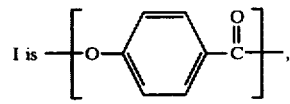,

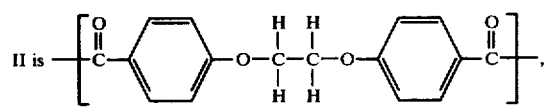,

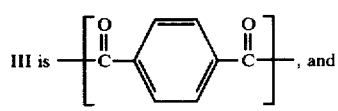, and

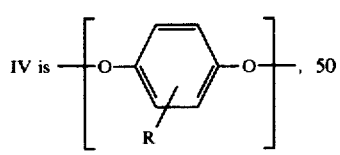, where
R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV and wherein at least some of the hydrogen atoms present upon the rings optionally may be replaced by substitution selected from the group consisting of an alkyl group of 1 to 5 carbon atoms, an alkoxy group of 1 to 5 carbon atoms, halogen, phenyl and substituted phenyl, and mixtures thereof.

33. The laminate of claim 29 wherein said wholly atomatic polyester comprises a melt processable wholly aromatic polyester which is capable of forming an anisotropic melt phase and consists essentially of the recurring ring moieties I, II, III, and IV wherein:

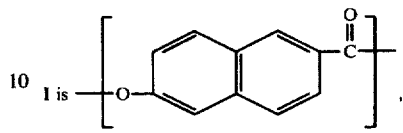,

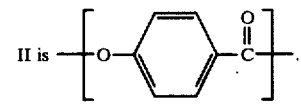.

III is a dioxy aryl moiety of the formula $\{O-Ar-O\}$ wherein Ar is a divalent radical comprising at least one aromatic ring, and IV is a dicarboxy aryl moiety of the formula

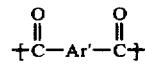

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

34. The laminate of claim 29 wherein said wholly aromatic polyester comprises a melt processable wholly aromatic polyester which is capable of forming an anisotropic melt phase and consists essentially of the recurring moieties, I, II and III wherein:

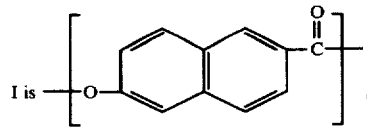,

II is a dioxy aryl moiety of the formula $\{O-Ar-O\}$ where Ar is a divalent radical comprising at least one aromatic ring, and III is a dicarboxy aryl moiety of the formula

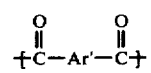

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

35. The laminate of claim 28 wherein said wholly aromatic polymer comprises a melt processable poly(ester-amide) which is capable of forming an anisotropic melt phase and which consists essentially of the recurring moieties I, II, III and optionally IV wherein:

I is 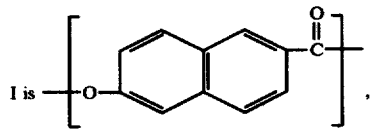,

II is

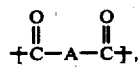, where A is a divalent radical comprising at least one aromatic ring or a divalent transcyclohexane radical;

III is {Y—Ar—Z}, where Ar is a divalent radical comprising at least one aromatic ring, Y is O, NH, or NR, and Z is NH or NR, where R is an alkyl group of 1 to 6 carbon atoms or an aryl group; and IV is {O—Ar'—O}, where Ar' is a divalent radical comprising at least one aromatic ring;

and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV, and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

36. The laminate of claim 20 wherein said polymer comprises a wholly aromatic polyester which comprises not less than about 10 mole percent of recurring units which include a naphthalene moiety.

37. The laminate of claim 36 wherein said wholly aromatic polyester exhibits an inherent viscosity of at least 2.0 dl./g. when dissolved in a concentration of 0.1 percent by weight in pentafluorophenol at 60° C.

38. The laminate of claim 36 wherein said naphthalene moiety of said wholly aromatic polyester is selected from the group consisting of a 6-oxy-2-naphthoyl moiety, a 2,6-dioxynaphthalene moiety, and a 2,6-dicarboxynaphthalene moiety.

* * * * *